April 21, 1959 C. F. BAROTHY 2,882,624

CARD HOLDER FOR TELEPHONE SET

Filed Aug. 29, 1957

INVENTOR
C. F. BAROTHY
BY R. P. Miller
ATTORNEY 2,882,624

CARD HOLDER FOR TELEPHONE SET

Charles F. Barothy, Indianapolis, Ind., assignor to Western Electric Company, Incorporated, New York, N.Y., a corporation of New York Application August 29, 1957, Serial No. 681,112
1 Claim. (Cl. 40—10.5)

This invention relates to card holders, and more particularly to a quick-detachable card holder to be mounted on the dial of a telephone set.

In calling dials or impulse senders used for automatic telephone equipment, a card holder is secured to the dial in such a position as to be easily viewed by the user of the equipment. Usually the card contains the call number of the subscriber's or user's telephone. Often it is necessary to assign a new number to the telephone or that the telephone be connected to a new line, thus necessitating changing the card. The card holder must therefore be adapted for easy removal while at the same time it must be capable of securely holding the card in position when the holder is mounted on the dial.

It is an object of the present invention to provide a simple durable card holder that may be easily removed from a mounted position.

A further object of the invention resides in a card holder having a backing plate in which an inconspicuous elongated tang is formed to secure the card on the dial.

Another object of the invention is the provision of a card holder having a scalloped or serrated backing plate for securely holding a card in position.

With these and other objects in view the present invention contemplates a card holder to be mounted on a finger wheel of a telephone set comprising an instruction card interposed between a transparent protective disc and a circular backing plate. This backing plate which is in the form of a concavo-convex disc has a scalloped or serrated rim portion that bites into a frame portion of the card holder. In addition, a pair of parallel chordal slots are formed in the disc to provide an elongated tang-like element that bears against a lug extending from the frame of the card holder into a retaining slot formed in the finger wheel. This tang acts as a resilient reinforcing element for the lug and can be readily depressed to permit removal of the card holder from the finger wheel.

Figure 1:
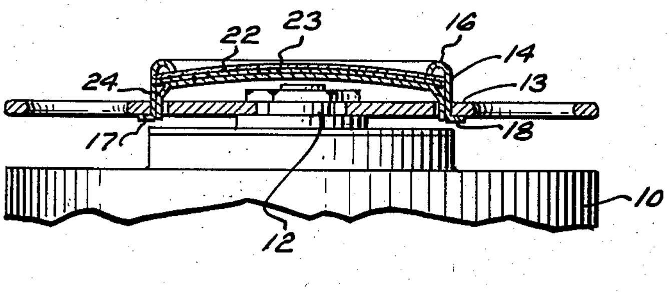
Figures 2, 3:
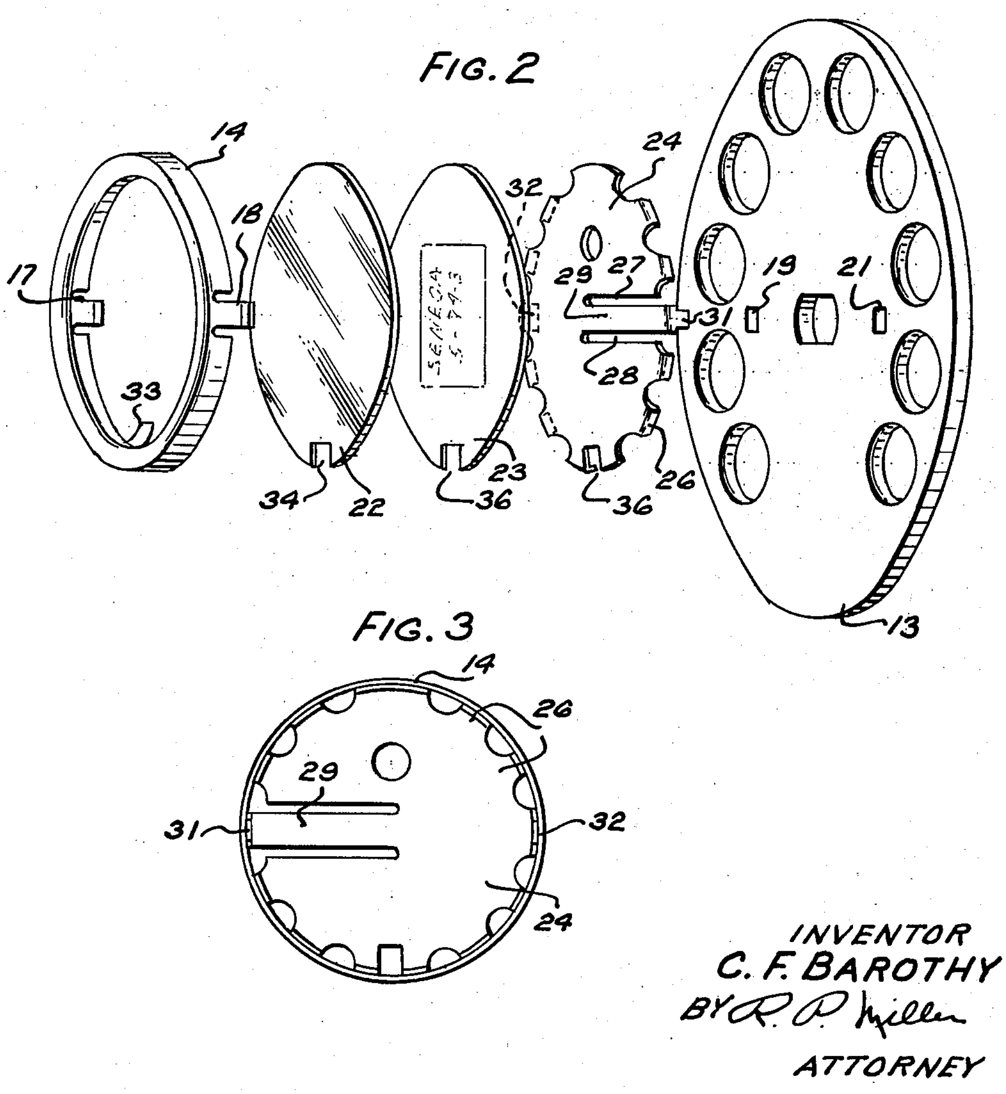

Other objects and advantages of the present invention will be apparent from a consideration of the following description and drawing, in which Fig. 1 is a partial assembly view of a telephone calling dial embodying the features of the invention and showing a finger wheel together with a card holder, a transparent protecting disc, an instruction card and a supporting disc;

Fig. 2 is an exploded view showing the details of the different elements of the card holder shown in Fig. 1, and Fig. 3 is a view looking into the card holder showing the details of the backing plate in engagement with the card holder.

The telephone call transmitter, to which this invention is particularly well adapted for use, generally consists of a casing 10 having a centrally disposed shaft 12 connected to a signal impulse generating mechanism (not shown). There is mounted on the shaft 12 a finger wheel 13 and mounted on the finger wheel is a cylindrical holder frame 14 having an inwardly turned rim portion 16. The frame 14 is retained on the finger wheel by means of a pair of depending lugs 17 and 18 that fit within suitable slots 19 and 21 formed in the body of the finger wheel. A transparent disc 22 and an instruction card 23 are retained against the turned over rim portion 16 through the agency of a resilient disc-like holding plate 24.

The retaining plate 24 is concavo-convex in shape and is made of a resilient metallic material. The diameter of the plate is made slightly larger than the inner peripheral diameter of the frame 14 and the outer periphery surface thereof is scalloped or serrated to provide a plurality of gripping elements 26, the ends of which are turned to provide sharp edged gripping elements that bite into the inner peripheral wall of the frame 14. The plate 24 is provided with a pair of parallel chordal slots 27 and 28 that extend substantially to the center thereof to provide a tang-like reinforcing element 29. Inasmuch as the plate 24 is constructed of resilient material, the tang-like member 29 may be readily flexed. The tang-like member 29 has its free extremity turned over to provide a portion 31 that engages the lug 18 when the card holder is assembled on the finger wheel. A second tang-like member 32 is formed on the plate 24 in a position diametrically opposed to portion 31 of tang-like element 29 so as to engage and reinforce the lug 17 when the card holder is assembled. In addition, the frame of the card holder 14 has a lug 33 formed thereon to fit within the slots 34, 36 and 37 formed respectively, and the transparent disc 22, the card 23 and the backing plate 24 thereby providing a means for holding these elements against relative movement when the card holder is assembled.

It may be appreciated that the scalloped rim portion of the plate 24 provides a plurality of elements 26 that bite into the card holder frame 14 to hold the assembled unit in position when the card holder is mounted on the finger wheel. It may be further understood that provision of the elongated tang-like member 29 permits the lug 18 to be resiliently and firmly supported while permitting it to be readily depressed to remove the card holder from the finger wheel.

It is to be understood that the above-described arrangement of the apparatus and the construction of elemental parts are simply illustrative of an application of the principles of the invention and many other modifications may be made without departing from the invention.

What is claimed is:

A card holder for a telephone dial finger wheel comprising a cylindrical frame having an inwardly retroflexed edge, a lug depending from the frame to secure the frame to the finger wheel, a transparent disc and an instruction card disposed in superposed relation within the frame, and a resilient concavo-convex backing plate disposed within and engaging the frame to hold the transparent disc and instruction card against the inwardly retroflexed edge of the frame, said plate being serrated along the peripheral edge thereof forming spaced projections, said projections being bent angularly and uniformly downwardly from the surface of the plate such that the outer peripheral sharp edge of each projection fully engages and bites into the inner peripheral surface of the frame, said plate having a pair of parallel chordal slots extending to a diametrical line substantially perpendicular to the slots and passing through the center of the plate to form an elongated resilient tang, said tang having a bent extremity to provide a section to engage the lug on the frame.

References Cited in the file of this patent

UNITED STATES PATENTS

| | | |
|---|---|---|
| 1,736,722 | Newman | Nov. 19, 1929 |
| 1,812,964 | Labaugh et al. | July 7, 1931 |
| 2,129,876 | Rumbold | Sept. 13, 1938 |